US009495004B2

(12) United States Patent
Cho et al.

(10) Patent No.: US 9,495,004 B2
(45) Date of Patent: Nov. 15, 2016

(54) DISPLAY DEVICE ADJUSTMENT BY CONTROL DEVICE

(71) Applicant: QUALCOMM Incorporated, San Diego, CA (US)

(72) Inventors: Yongwoo Cho, Seoul (KR); Duck Hoon Kim, Seoul (KR); Sungwoong Kim, Seoul (KR); Minho Jin, Seoul (KR); Kyuwoong Hwang, Daejeon (KR)

(73) Assignee: QUALCOMM Incorporated, San Diego, CA (US)

( * ) Notice: Subject to any disclaimer, the term of this patent is extended or adjusted under 35 U.S.C. 154(b) by 152 days.

(21) Appl. No.: 14/480,230

(22) Filed: Sep. 8, 2014

(65) Prior Publication Data
US 2016/0070337 A1 Mar. 10, 2016

(51) Int. Cl.
G09G 5/00 (2006.01)
G06F 3/00 (2006.01)
H04N 5/58 (2006.01)
H04N 21/41 (2011.01)
H04N 21/422 (2011.01)
H04N 21/431 (2011.01)
H04N 21/45 (2011.01)
G09G 3/00 (2006.01)
H04N 21/4223 (2011.01)
(Continued)

(52) U.S. Cl.
CPC ............... *G06F 3/005* (2013.01); *G09G 3/001* (2013.01); *H04N 5/58* (2013.01); *H04N 21/4126* (2013.01); *H04N 21/42202* (2013.01); *H04N 21/42222* (2013.01); *H04N 21/4318* (2013.01); *H04N 21/4532* (2013.01); *G09G 2320/066* (2013.01); *G09G 2320/0626* (2013.01); *G09G 2320/0666* (2013.01); *G09G 2354/00* (2013.01); *G09G 2360/144* (2013.01); *G09G 2360/145* (2013.01); *H04N 21/4223* (2013.01); *H04N 21/44218* (2013.01); *H04N 21/44222* (2013.01); *H04N 21/4667* (2013.01); *H04N 21/4854* (2013.01)

(58) Field of Classification Search
None
See application file for complete search history.

(56) References Cited

U.S. PATENT DOCUMENTS

2005/0134599 A1    6/2005  Nayar et al.
2010/0085462 A1*   4/2010  Sako ................... G02B 27/017
                                                 348/333.01
(Continued)

FOREIGN PATENT DOCUMENTS

EP    2037677 A1      3/2009
WO    2011155228 A1  12/2011
WO    2012053480 A1   4/2012

OTHER PUBLICATIONS

International Search Report and Written Opinion—PCT/US2015/045833—ISA/EPO—Oct. 27, 2015, 13 pages.

Primary Examiner — Andrew Sasinowski
Assistant Examiner — Henok Heyi
(74) Attorney, Agent, or Firm — Toler Law Group, PC

(57) ABSTRACT

A method, performed in a control device, for adjusting a display device in communication with the control device is disclosed. The method may include receiving an image of a scene including the display device from an image sensor configured with a field of view overlapping at least a portion of view of a user. A display condition of the display device may be detected from the image. The control device may determine context information associated with the user from the image. Based on the display condition and the context information associated with the user, an output display condition of the display device may be determined. A control signal for adjusting the display device may then be generated based on the output display condition.

30 Claims, 13 Drawing Sheets

(51) Int. Cl.
*H04N 21/442* (2011.01)
*H04N 21/466* (2011.01)
*H04N 21/485* (2011.01)

(56) References Cited

U.S. PATENT DOCUMENTS

| | | |
|---|---|---|
| 2012/0081279 A1 | 4/2012 | Greenebaum et al. |
| 2012/0179472 A1 | 7/2012 | Ryu et al. |
| 2012/0200783 A1 | 8/2012 | Ito et al. |
| 2012/0218321 A1 | 8/2012 | Ake et al. |
| 2013/0128074 A1* | 5/2013 | Mitsugi ................ H04N 5/232 348/223.1 |
| 2013/0176415 A1 | 7/2013 | Kim et al. |
| 2013/0271004 A1 | 10/2013 | Min et al. |
| 2014/0063055 A1* | 3/2014 | Osterhout ............... G06F 3/005 345/633 |
| 2014/0115692 A1 | 4/2014 | Lee |

* cited by examiner

| DISPLAY CONDITION (SHARPNESS, BRIGHTNESS, CONTRAST) | ENVIRONMENTAL CONDITION (INTENSITY) | USER ACTIVITY | OUTPUT DISPLAY CONDITION (SHARPNESS, BRIGHTNESS, CONTRAST) |
|---|---|---|---|
| DISPLAY DATA 802 | ENVIRONMENTAL DATA 808 | NOD | OUTPUT DISPLAY DATA 818 |
| | ENVIRONMENTAL DATA 810 | | OUTPUT DISPLAY DATA 820 |
| DISPLAY DATA 804 | ENVIRONMENTAL DATA 812 | VIEW DISPLAY DEVICE | OUTPUT DISPLAY DATA 822 |
| | ENVIRONMENTAL DATA 814 | | OUTPUT DISPLAY DATA 824 |
| DISPLAY DATA 806 | ENVIRONMENTAL DATA 816 | MOVE TOWARD DISPLAY DEVICE | OUTPUT DISPLAY DATA 826 |
| ... | ... | ... | ... |

DISPLAY DEVICE ADJUSTMENT BY CONTROL DEVICE

TECHNICAL FIELD

The present disclosure relates to controlling display devices by control devices, and more specifically, to providing control signals to adjust display devices by control devices.

BACKGROUND

Modern display devices such as smart televisions, personal computers, laptop computers, tablet computers, etc. are widely used in various conditions. For example, a user may view a smart television under different conditions at different times. In the daylight hours, for instance, a display screen of the smart television may be subject to direct or indirect sunlight that reduces visibility of the display screen for the user. On the other hand, the screen of the smart television viewed at night may be too bright for the user.

Conventional display devices are typically equipped with a number of features that allow users to manually set display settings. For example, a smart television may allow a user to manually turn on an auto brightness feature using a remote control. Manually setting such features may adjust a brightness of a display screen in the display device according to the brightness of the environmental condition.

Some display devices are equipped with sensors to detect various conditions such as a light level, a movement of an object, and an image. For example, a smart television may recognize a gesture of a user as an input for controlling a display setting. In response to detecting such conditions, the display devices may control the display screen.

Although conventional display devices may be controlled in response to detecting such external conditions, such display devices may not adequately reflect an actual display condition of the display screen. For example, such display devices may not be able to control the display setting to compensate for a shadow or a glare cast on a display screen or a portion thereof. In addition, such display devices may not be able to control the display setting to reflect a user's intention.

SUMMARY

The present disclosure relates to generating a control signal for adjusting a display device based on one or more images including the display device that may be received from an image sensor configured with a field of view overlapping at least a portion of a view of a user.

According to one aspect of the present disclosure, a method, performed in a control device, for adjusting a display device in communication with the control device is disclosed. The method may include receiving an image of a scene including the display device from an image sensor configured with a field of view overlapping at least a portion of view of a user. A display condition of the display device may be detected from the image. The control device may determine context information associated with the user from the image. Based on the display condition and the context information associated with the user, an output display condition of the display device may be determined. A control signal for adjusting the display device may then be generated based on the output display condition. This disclosure also describes apparatus, a device, a server, a system, a combination of means, and a computer-readable medium relating to this method.

According to another aspect of the present disclosure, a control device for adjusting a display device in communication with the control device is disclosed. The control device may include a processor configured to receive an image including the display device from an image sensor configured with a field of view overlapping at least a portion of a view of a user. The processor may include a display condition detection unit configured to detect a display condition of the display device from the image and a context information determination unit configured to determine context information associated with the user from the image. The processor may also include an output display condition determination unit configured to determine an output display condition of the display device based on the display condition and the context information associated with the user; and a display device control unit configured to generate a control signal for adjusting the display device based on the output display condition.

BRIEF DESCRIPTION OF THE DRAWINGS

Embodiments of the inventive aspects of this disclosure will be understood with reference to the following detailed description, when read in conjunction with the accompanying drawings.

FIG. 8 illustrates an exemplary user preference database that may be used to determine an output display condition of a display device according to one embodiment of the present disclosure.

DETAILED DESCRIPTION

Reference will now be made in detail to various embodiments, examples of which are illustrated in the accompanying drawings. In the following detailed description, numerous specific details are set forth in order to provide a thorough understanding of the inventive aspects of this disclosure. However, it will be apparent to one of ordinary skill in the art that the inventive aspects of this disclosure may be practiced without these specific details. In other instances, well-known methods, procedures, systems, and components have not been described in detail so as not to unnecessarily obscure aspects of the various embodiments.

Figure 1:
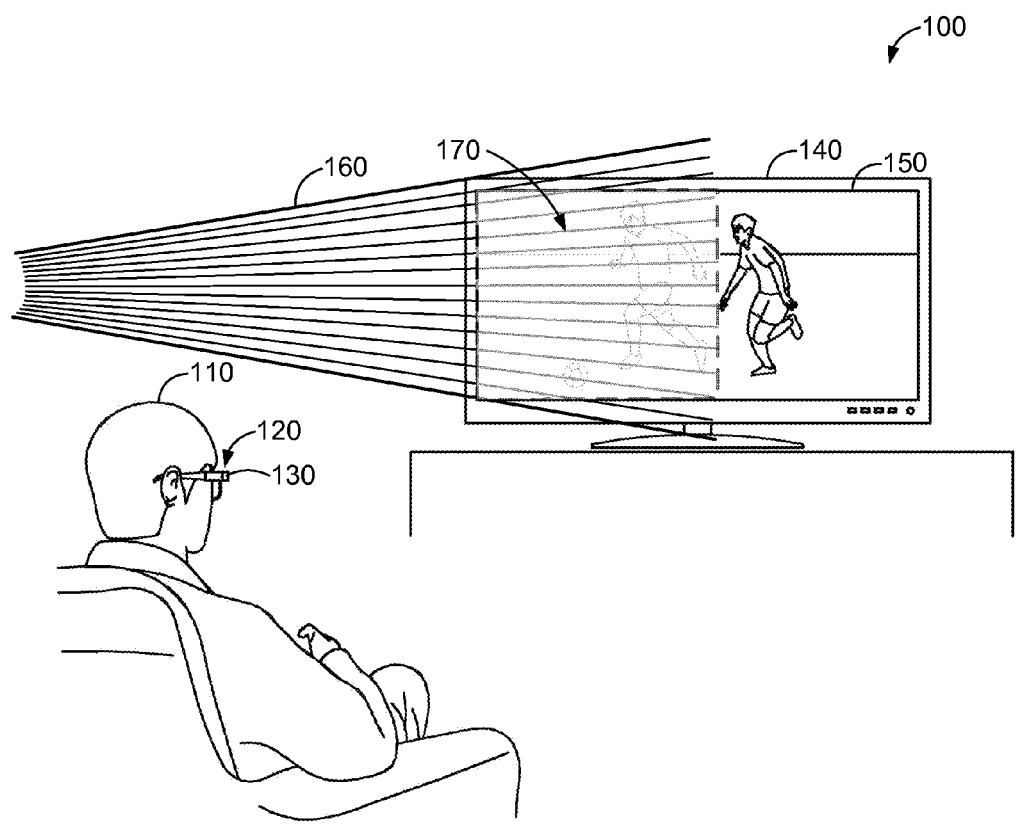
FIG. 1 illustrates a wearable device worn by a user and equipped with an image sensor for capturing one or more images of a scene including a display device, according to one embodiment of the present disclosure.

FIG. 1 illustrates a wearable device 120 worn by a user 110 and equipped with an image sensor 130 for capturing one or more images of a scene 100 including a display device 140, according to one embodiment of the present disclosure. In the illustrated embodiment, the wearable device 120 is smart glasses but may be any suitable computing devices equipped with image capturing, image processing, and communication capabilities and can be worn by the user 110 or disposed on any suitable portions of the user 110. In one embodiment, the wearable device 120 may be worn by or disposed on the user 110 such that the image sensor 130 may track a view of the user 110. Although the image sensor 130 is shown as being mounted on or disposed on the smart glasses 120, it may also be mounted on any other items or articles that can be worn by the user 110, such as a headphone, an earphone, a cap, a hat, etc.

In FIG. 1, the user 110 of the wearable device 120 may be in a room and watching a soccer game that is being displayed on a screen 150 of the display device 140. While the user 110 is watching the game on the display device 140, sunlight 160 may illuminate the display device 140 to cast a glare on a portion 170 (indicated with a dashed box) of the screen 150. Due to the glare from the sunlight 160, the portion 170 may not be readily visible to the user 110.

The image sensor 130 in the wearable device 120 may be configured with a field of view overlapping at least a portion of a view of the user 110. In this configuration, the image sensor 130 may track the view of the user 110. In some embodiments, the image sensor 130 may be configured to capture scenes continuously in real-time (e.g., 30 frames per second). As shown, while the user 110 of the wearable device 120 in the room views the scene 100 including the soccer game being displayed on the display device 140, the wearable device 120 may capture a plurality of images of the scene 100 including the display device 140, on which the soccer game is being displayed. For example, the scene 100 illustrated in FIG. 1 may be captured initially by the image sensor 130 of the wearable device 120 at a specified point in time. The wearable device 120 may then capture a plurality of subsequent images of scenes including the display device 140 that is within the field of view of the image sensor 130. Although the wearable device 120 is shown with one image sensor 130, it may include any suitable number of image sensors for capturing a scene. In this case, the image sensors may be arranged at any suitable locations on the wearable device 120. As used herein, the term "capture" or "capturing" may indicate receiving or generating an image of a scene and may include an operation of sensing, detecting, recording, or temporarily storing the image.

Figure 2A:
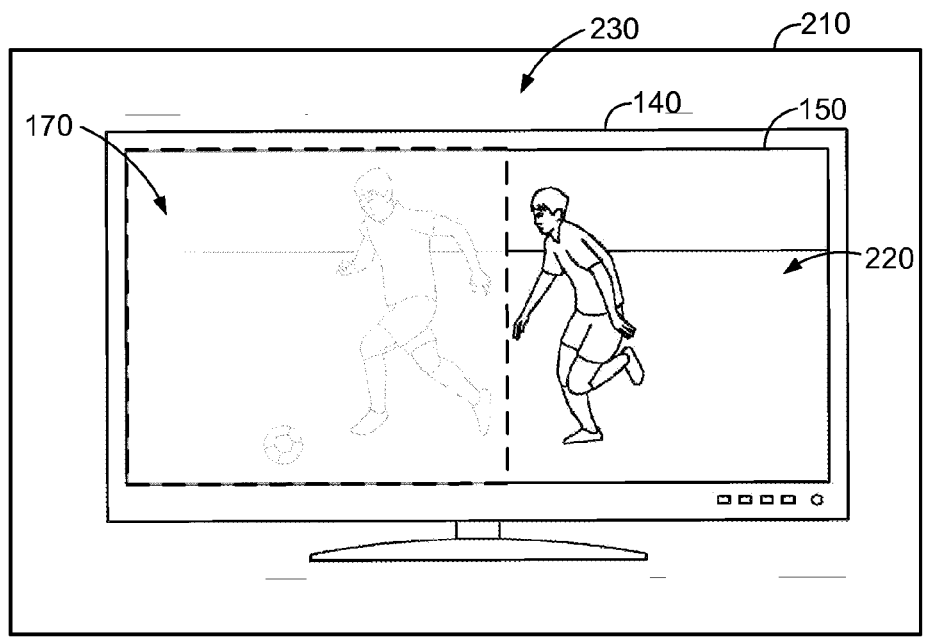
FIG. 2A depicts an image of the scene including a display device that may be captured by an image sensor for controlling the display device, according to one embodiment of the present disclosure.

Upon capturing a plurality of images of the scene 100, the wearable device 120 may be configured to perform an image analysis of one or more captured images for controlling the display device 140. FIG. 2A depicts an image 210 of the scene 100 including the display device 140 that may be captured by the image sensor 130 for controlling the display device 140, according to one embodiment of the present disclosure. As shown, the image 210 includes the glare portion 170 and a non-glare portion 220 on the screen 150 of the display device 140 due to the sunlight 160.

Upon receiving the image 210 from the image sensor 130, the wearable device 120 may detect a display condition of the display device 140 from the image 210. As used herein, the term "display condition" may refer to one or more display parameter values of an image displayed on a display device, and may include parameter values such as sharpness values, brightness values, contrast values, color values, etc. that describe or characterize a plurality of pixels in the image. In the illustrated embodiment, the wearable device 120 may identify a display region indicative of the screen 150 from the image 210 and determine parameter values (e.g., brightness values, sharpness values, contrast values, or the like) for a plurality of pixels associated with the display region. Based on the determined parameter values for the pixels, the display region may be segmented into a plurality of portions 170 and 220 by grouping pixels having an identical parameter value or similar parameter values. For example, the pixels associated with the glare portion 170 in the image 210 may be determined to have high brightness values and may be segmented into a group. On the other hand, the pixels associated with the non-glare portion 220 in the image 210 may be determined to have lower brightness values and segmented into another group. The wearable device 120 may then determine a display condition for each of the segmented portions 170 and 220.

The wearable device 120 may also be configured to determine context information associated with the user 110 from the image 210. As used herein, the term "context information" may refer to data or information describing or characterizing an environment and/or an activity (e.g., an act or action) of a user and may include historical data of such environment and/or activity associated with using the display device 140. As shown in the image 210 of FIG. 2A, the wearable device 120 may identify a background region 230 in the image 210 that lies outside the screen 150 of the display device 140. An environmental condition of the background region 230 may then be determined by calculating a mean intensity for a plurality of pixels in the background region 230.

Based on the display condition of the display device 140 and the context information associated with the user 110, the wearable device 120 may determine an output display condition of the display device 140. According to one embodiment, the wearable device 120 may determine the output display condition of the display device 140 by accessing a user preference database that maps a plurality of output display conditions to a plurality of display conditions and a plurality of context information items. Each of the output display conditions may include a plurality of parameter values (e.g., a brightness value, a sharpness value, a contrast value, or the like) for a plurality of pixels. In this process, the wearable device 120 may use the display condition of the display device 140 and the context information associated with the user 110 as an index to the user preference database to select an output display condition of the display device 140 from the plurality of output display conditions. As used herein, the term "information" may refer to a piece or item of information in a singular or plural form, and is used interchangeably with the term "information item" or any variations thereof.

Figure 2B:
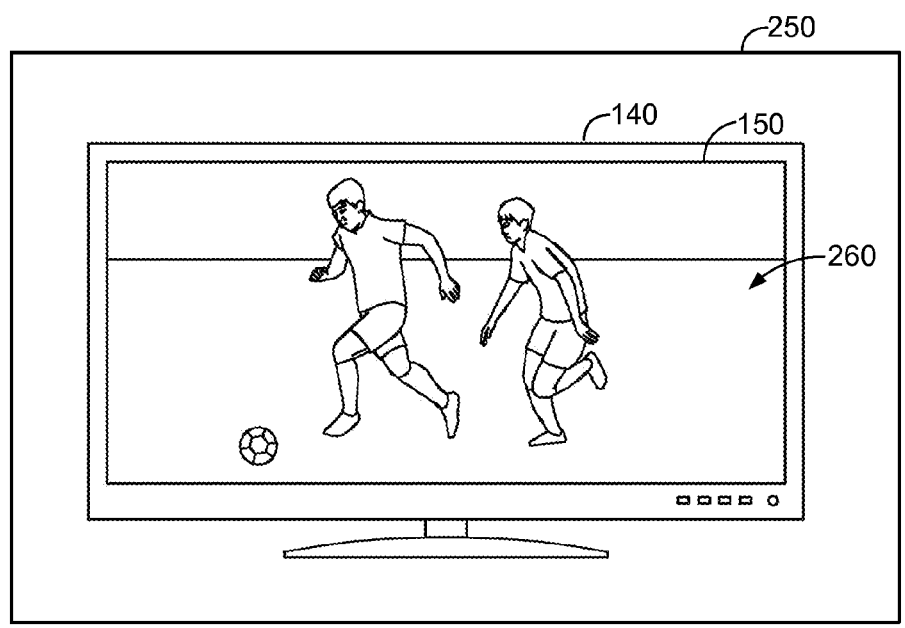
FIG. 2B depicts a scene including a display image displayed on a screen of a display device without substantial glare effect, as viewed by a user, according to one embodiment of the present disclosure.

In one embodiment, the wearable device 120 may determine an output display condition for each of the segmented portions 170 and 220 in the display region (i.e., the screen 150) of the display device 140 based on the display condition associated with the portion and the context information. Upon determining the output display conditions, the wearable device 120 may generate one or more control signals indicative of one or more display parameters for adjusting the display device 140 based on the determined output conditions and provide the signals to the display device 140. In response to the control signals, the display device 140 may adjust one or more display parameter values configured to reduce or eliminate glare effect in the glare portion 170 and generate a display image for output on the screen 150. For example, the display device 140 may increase the brightness values and contrast values of the pixels associated with the glare portion 170 to compensate for the glare. In this manner, the user 110 may view a scene 250 including a display image 260 displayed on the screen 150 of the display device 140 without substantial glare effect, as shown in FIG. 2B. Although the wearable device 120 is illustrated as controlling one display device 140, it may control any suitable number of display devices (e.g., a smart TV and a tablet computer) by analyzing one or more images of a scene that includes such display devices.

Figure 3:
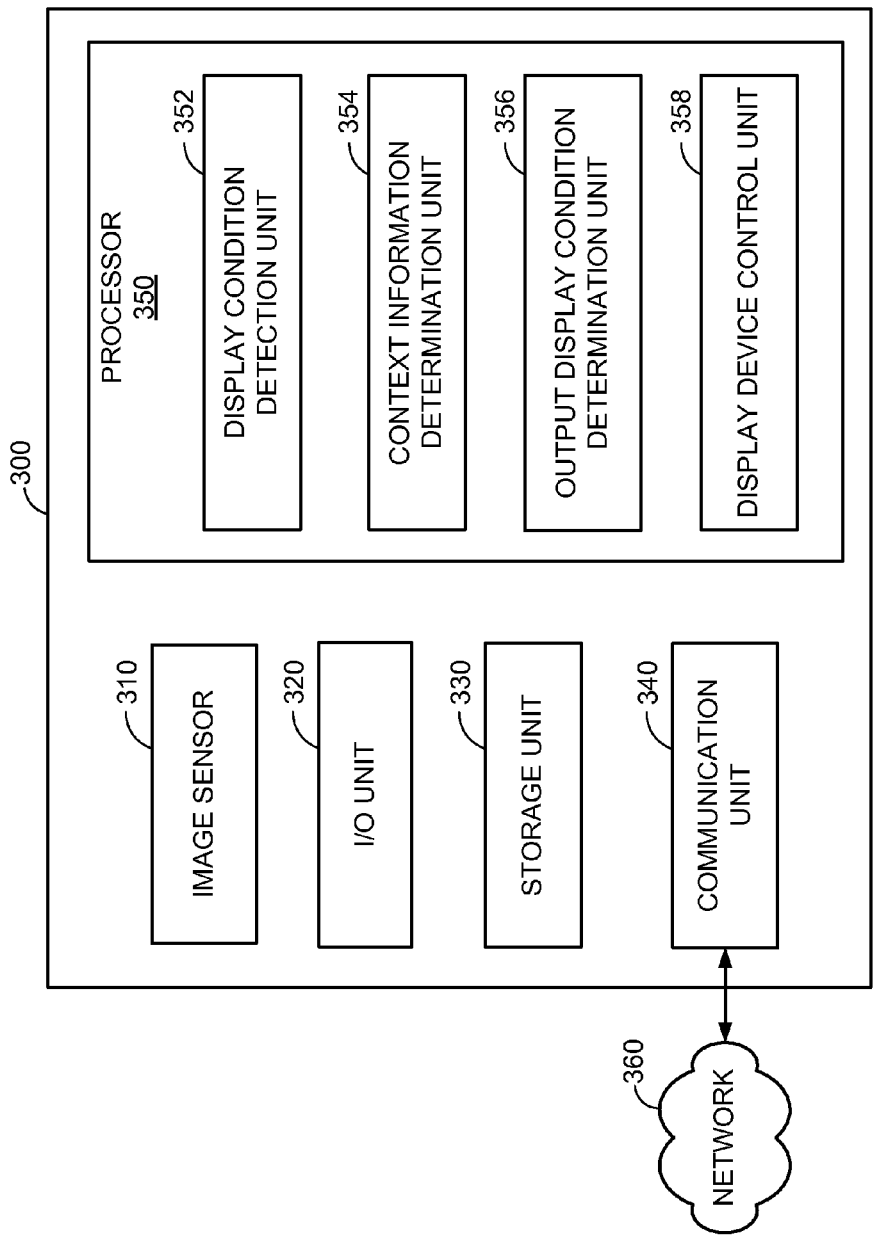
FIG. 3 is a block diagram of a control device configured to receive one or more images of a scene including a display device and generate one or more control signals for adjusting the display device, according to one embodiment of the present disclosure

FIG. 3 is a block diagram of a control device 300 configured to receive one or more images of a scene including a display device and generate one or more control signals for adjusting the display device, according to one embodiment of the present disclosure. The control device 300 may include an image sensor 310, an I/O unit 320, a storage unit 330, a communication unit 340, and a processor 350. The processor 350 may include a display condition detection unit 352, a context information determination unit 354, an output display condition determination unit 356, and a display device control unit 358. The control device 300 may be any suitable computing or electronic devices that may be equipped with image processing and communication capabilities to generate one or more control signals for adjusting a display device from one or more images of the display device. The display device may be any suitable devices (e.g., a TV, a smart TV, a smartphone, a tablet computer, a personal digital assistant (PDA), etc.), which may be equipped with a display screen and communication capabilities for communicating wirelessly with the control device 300.

In one embodiment, the control device 300 may be the wearable device 120 (e.g., smart glasses) including the image sensor 310, which may be the image sensor 130 or another image sensor. According to another embodiment, the image sensor 310 may be an external unit equipped with communication capabilities and disposed on any suitable device or object (e.g., a headphone, an earphone, a cap, a hat, etc.) worn by a user to track a view of the user. In this case, the control device 300 may wirelessly communicate with the image sensor 310 to receive images captured by the image sensor 310.

The image sensor 310 may be configured to capture in real-time a plurality of images of scenes, each of which may include the display device. The image sensor 310 may be any suitable image sensing devices (e.g., a camera, a camera module, etc.) that are capable of capturing or sensing an image of a scene or an object. In addition, the image sensor 310 may be arranged on the user with a field of view overlapping at least a portion of a view of the user to allow the image sensor 310 to track the view of the user. As each image is captured, the image sensor 310 may provide the captured image to the display condition detection unit 352 and the context information determination unit 354 in the processor 350.

The storage unit 330 in the control device 300 may be configured to store one or more images received from the image sensor 310 or an external image sensor via the communication unit 340. For example, the storage unit 330 may store image data for one or more images of a scene including the display device that may be captured by the image sensor 310 or received from the external image sensor. The image data for the images may include information on a plurality of pixels and sizes for the images. The images or image data may be accessed by the processor 350 for determining an output display condition of the display device to control one or more output display parameters of the display device.

In one embodiment, the storage unit 330 may store a user preference database which may be accessed by the processor 350 to select an output display condition among a plurality of output display conditions for the display device. For example, the user preference database may include a set of display conditions (e.g., one or more display parameter values), environmental conditions (e.g., intensity values indicative of levels of brightness or illumination), user activities (e.g., a gesture of a user), and output display conditions (e.g., one or more output display parameter values), as will be described in more detail with reference to FIG. 8 below. In another embodiment, the user preference database may be stored in an external device, which may communicate with the communication unit 340 via the network 360. The storage unit 330 may be implemented using suitable storage or memory device such as a RAM (Random Access Memory), a ROM (Read Only Memory), an EEPROM (Electrically Erasable Programmable Read Only Memory), a flash memory, an SSD (Solid State Drive), etc.

The control device 300 may be configured to receive, from the display device, one or more display images being displayed on the display device in real-time via the communication unit 340 over a network 360 (e.g., a wireless communication network such as Wi-Fi, Bluetooth, etc.). The received display images may be provided to the display condition detection unit 352 in the processor 350 for use in detecting a display condition of the display device. In one embodiment, the processor 350 may receive, via the communication unit 340, sensor data from one or more environmental sensors such as an image sensor, a motion sensor, a light sensor, and the like that may be capable of detecting environmental conditions and/or activities of a user. Such an image sensor may be disposed on any suitable devices or items associated with a user to detect one or more facial features or gestures of the user. The processor 350 may process the received display images and the sensor data to determine context information associated with the user.

The I/O unit 320 may be configured to receive commands from a user and/or output information for the user. In some embodiments, the user may select or provide one or more desired display parameter values of the display device via the I/O unit 320. The selected one or more display parameters may be provided to the display device for adjusting the display device and/or to the context information determination unit 354 for determining historical data associated with the display device. As illustrated herein, the I/O unit 320 may be any suitable device capable of receiving commands and/or outputting information and include a touch screen, a dial, a button, a keypad, a touchpad, a display screen, or the like.

The display condition detection unit 352 in the processor 350 may be configured to receive one or more images of a scene including the display device from the image sensor 310 or the external image sensor and detect a display condition of the display device. In some embodiments, the display condition detection unit 352 may identify a display screen of the display device as a display region in an image of the scene that includes the display device. The display condition including one or more display parameter values of the display device in the image may be determined based on a plurality of pixels in the display region. In one embodiment, the display condition detection unit 325 may segment the display region into a plurality of portions by grouping pixels having an identical display parameter value or similar parameter values as a portion. According to another embodiment, the display condition detection unit 352 may receive, from the display device, a reference display image displayed on the display device and detect a reference display condition from the display image. The display region may be segmented into a plurality of portions based on a comparison between the display condition and the reference display condition and a plurality of display conditions for the plurality of segmented portions may be determined, as described in more detail with reference to FIG. 6. The display condition for the display region or the display conditions for the segmented portions may then be provided to the output display condition determination unit 356 for use in determining an output display condition of the display device.

The context information determination unit 354 in the processor 350 may receive the one or more images of a scene including the display device that are provided to the display condition detection unit 352 along with one or more images of another scene that may include one or more facial features, gestures, or the like of a user from an external image sensor via the communication unit 340 over the network 360. The context information determination unit 354 may determine context information associated with the user from the images of the scenes. In one embodiment, the context information determination unit 354 may receive, for each of the images, information on the identified display region from the display condition detection unit 352 and detect a background region located outside the display region. An environmental condition such as intensities of a plurality of pixels in the background region of the image may then be determined. Such an environmental condition may indicate a brightness or illumination level of the environment for the scene or the user. In another embodiment, the context information determination unit 354 may also receive sensor data such as a brightness value from an external light sensor for use in determining the environmental condition of the background region.

In some embodiments, the context information determination unit 354 may determine an activity of the user based on the images of the scene including the display device and the images of the scene that may include one or more facial features, gestures, or the like of a user. The activity of the user may include a facial expression of the user, a view direction of the user, a motion or gesture of the user, a distance between the user and the display device, and the like that may be indicative of an activity of the user. In one embodiment, an image sensor may track the face of the user including the eyes of the user. In this case, the context information determination unit 354 may receive one or more images of the user's face from the image sensor and determine an activity of the user. For example, the context information determination unit 354 may detect squinting of the user's eyes in the images as the user's activity, indicating that display parameter values of the display device may need to be adjusted. Additionally or alternatively, the context information determination unit 354 may also receive sensor data indicative of a movement of the user from an external motion sensor for use in determining the activity of the user. The context information including the environmental condition and the user activity may be provided to the output display condition determination unit 356 for use in adjusting the display device.

In one embodiment, the context information determination unit 354 may generate historical data of one or more environments (e.g., lighting environments or conditions) and/or activities associated with using the display device. The historical data may include data or information describing or relating to one or more display conditions of the display device that may have been viewed by the user in one or more environmental conditions at one or more instances in the past. For example, the historical data may include one or more desired display conditions of the display device and one or more environmental conditions associated with the display conditions. The display conditions may include one or more display parameter values that have been selected by the user via the I/O unit 320. Additionally, the environmental conditions may be determined from pixel intensities in background regions of captured images that include the display device and/or from one or more brightness values received from an external light sensor. The context information determination unit 354 may store the historical data in the storage unit 330 that may be updated in response to an input or command of the user. The historical data may be accessed by the output display condition determination unit 356 for use in selecting one or more output display parameter values of the display device.

The output display condition determination unit 356 may be configured to determine an output display condition for adjusting the display device. In this process, the output display condition determination unit 356 may receive a display condition of the display device from the display condition detection unit 352 and context information associated with the user from the context information determination unit 354. For use in determining the output display condition, the user preference database may be accessed from the storage unit 330. The output display condition determination unit 356 may then select an output display condition of the display device associated with the display condition and the context information from a plurality of predetermined output display conditions in the user preference database.

In some embodiments, the output display condition determination unit 356 may receive historical data including one or more display conditions of the display device and an environmental condition associated with each of the display conditions from the storage unit 330. The output display condition determination unit 356 may then compare the determined environmental condition and each of the received environmental conditions in the historical data. A display condition that is associated with an environmental condition in the historical data may be selected as an output display condition of the display device if the environmental condition is identical or similar to the determined environmental condition. The output display condition of the display device may then be provided to the display device control unit 358 in the processor 350.

The display device control unit 358 may receive the output display condition for the display device and generate one or more control signals for adjusting the display device. In one embodiment, one or more control signal may be generated for adjusting one or more display parameter values of pixels of the screen 150 in the display device. Alternatively, the display device control unit 358 may generate one or more control signals to control one or more display parameter values of pixels for each of the segmented portions. For example, the display device control unit 358 may generate a plurality of control signals configured to adjust a display condition of one or more of the segmented portions of the display device.

In some embodiments, the display device control unit 358 may generate one or more control signals for adjusting the display device and transmit the signals to the display device periodically or based on a time interval that may be adjusted. The time interval may be determined or adjusted based on a change of the output display conditions. For example, if changes in the output display conditions exceed a predetermined threshold rate of change, the time interval for generating and/or transmitting the control signals may be reduced. On the other hand, if a rate of change in the output display conditions is identical to the predetermined threshold rate of change, the time interval may remain the same. If the rate of change is less than the predetermined threshold value, the interval of the control signals may be increased.

Figure 4:
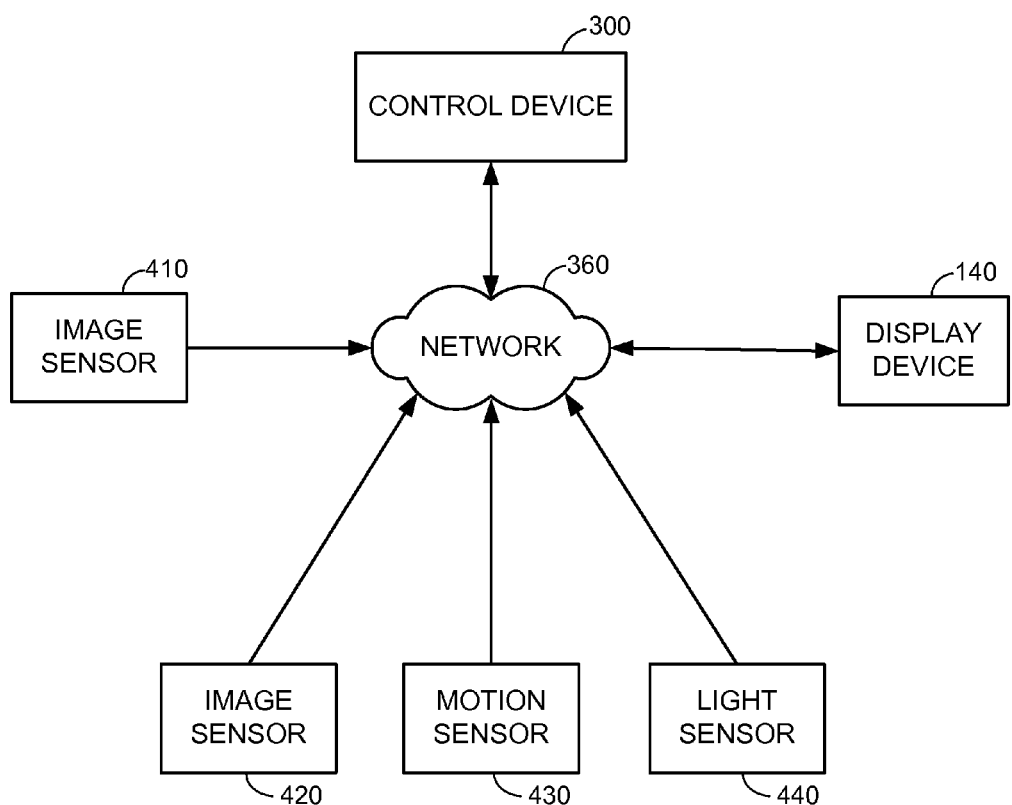
FIG. 4 illustrates a control device configured to generate one or more control signals for adjusting a display device and provide the control signals to the display device upon receiving sensor data from a plurality of image sensors, a motion sensor, and a light sensor, according to one embodiment of the present disclosure.

FIG. 4 illustrates the control device 300 configured to generate one or more control signals for adjusting the display device 140 and provide the control signals to the display device 140 upon receiving sensor data from a plurality of image sensors 410 and 420, a motion sensor 430, and a light sensor 440, according to one embodiment of the present disclosure. In the illustrated embodiment, the display device 140, the plurality of image sensors 410 and 420, the motion sensor 430, and the light sensor 440 may be equipped with communication capabilities and suitably arranged in a location (e.g., a room) to allow communications with the control device 300 via the network 360. The image sensor 410 may be arranged on a user with a field of view overlapping at least a portion of a view of the user to capture or track the view of the user. The image sensor 420 may be disposed on any suitable devices or items to allow detecting or tracking a face of the user. In this configuration, while the user is viewing a scene including the display device 140, one or more images of the scene including a display screen (e.g., a photograph, a TV program, a website, etc.) of the display device 140 may be captured by the image sensor 410, and one or more images of the face of the user including his or her eyes may be captured by the image sensor 420. Additionally, the motion sensor 430 may detect or track a movement of the user and the light sensor 440 may detect an ambient brightness or illumination level of the display device 140 and/or the user.

The control device 300 may be configured to receive, from the image sensor 410, one or more images of a scene including the display device 140 through the network 360. From each of the images including the display device 140, a display region indicative of the screen 150 of the display device 140 may be identified and a display condition of the display region (e.g., one or more display parameter values) may be determined. In addition, the context information determination unit 354 in the control device 300 may determine context information associated with the user (e.g., an environmental condition, an activity of a user, etc.) from the image including the display device 140. According to one embodiment, the control device 300 may also identify a background region located outside the display region and determine an environmental condition such as intensities of a plurality of pixels in the background. Additionally or alternatively, the control device 300 may determine or infer an activity of the user such as a view direction of the user, a gesture of the user, a distance between the user and the display device 140, etc. from the image including the display device 140. In addition, the control device 300 may receive one or more images of the face of the user including the eyes of the user from the image sensor 420. From the received images of the face of the user, the control device 300 may also determine the activity of the user such as a facial expression of the user (e.g., squinting of the eyes, blinking, frown, etc.).

The control device 300 may receive motion sensor data indicative of a movement of the user from the motion sensor 430 and light sensor data indicative of an ambient brightness or illumination level of the display device 140 from the light sensor 440. The motion sensor data and the light sensor data may be used for determining context information associated with the user. In one embodiment, the control device 300 may determine an activity of a user from the motion sensor data. For example, the control device 300 may detect moving the user toward the display device 140, which may result in adjusting one or more display parameter values of the display device 140. According to some embodiments, the light sensor data may be used in determining an environment condition of a background region detected in the image received from the image sensor 410.

The control device 300 may determine one or more output display conditions of the display device 140 based on the determined display condition and at least one of the determined environmental condition and the determined activity of the user. One or more control signals for adjusting the display device 140 may be generated based on the determined output display conditions. The generated control signals may then be provided to the display device 140 via the network 360. The display device 140 may adjust one or more display parameter values such as sharpness values, brightness values, contrast values, etc. in response to receiving the control signals.

Figure 5:
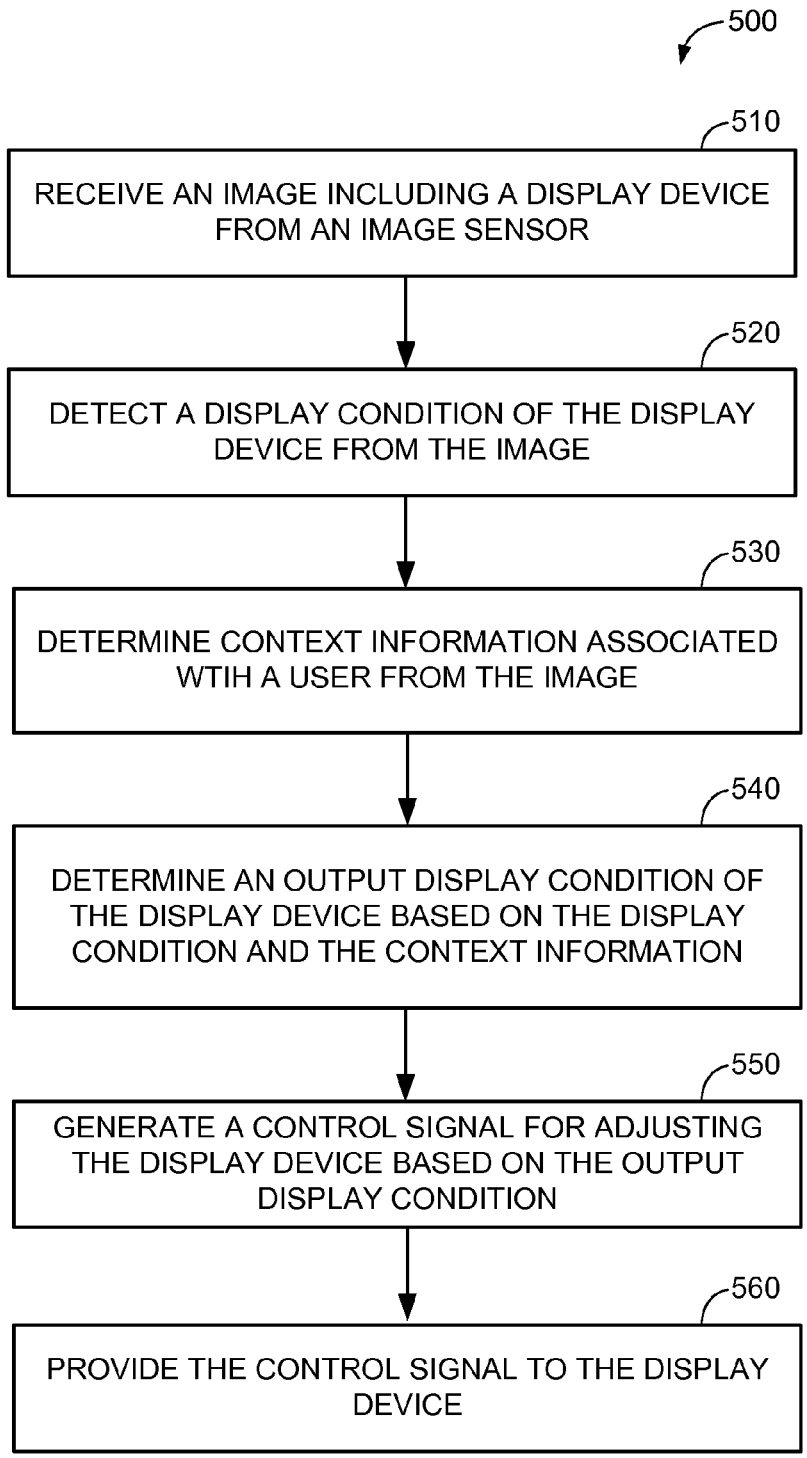
FIG. 5 is a flowchart of a method, performed in a control device, for generating a control signal for adjusting a display device based on an image that includes the display device, according to one embodiment of the present disclosure.

FIG. 5 is a flowchart of a method 500, performed in the control device 300, for generating a control signal for adjusting a display device based on an image that includes the display device, according to one embodiment of the present disclosure. The processor 350 in the control device 300 may receive an image including the display device from an image sensor, which may be the image sensor 310 in the control device 300 or the external image sensor 410, at 510. The display condition detection unit 352 in the processor 350 may detect a display condition of the display device from the received image, at 520. In this case, the display condition may include one or more display parameter values such as a sharpness value, a contrast value, a brightness value, etc. for the display device.

At 530, the context information determination unit 354 in the processor 350 may determine context information associated with a user from the image. In this case, the context information may include at least one of an environmental condition of a background region in the image and an activity of the user. The output display condition determination unit 356 in the processor 350 may determine an output display condition of the display device based on the display condition received from the display condition detection unit 352 and the context information received from the context information determination unit 354, at 540. At 550, the display device control unit 358 in the processor 350 may generate a control signal for adjusting the display device based on the determined output display condition. The generated control signal may then be provided to the display device, at 560.

Figure 6:
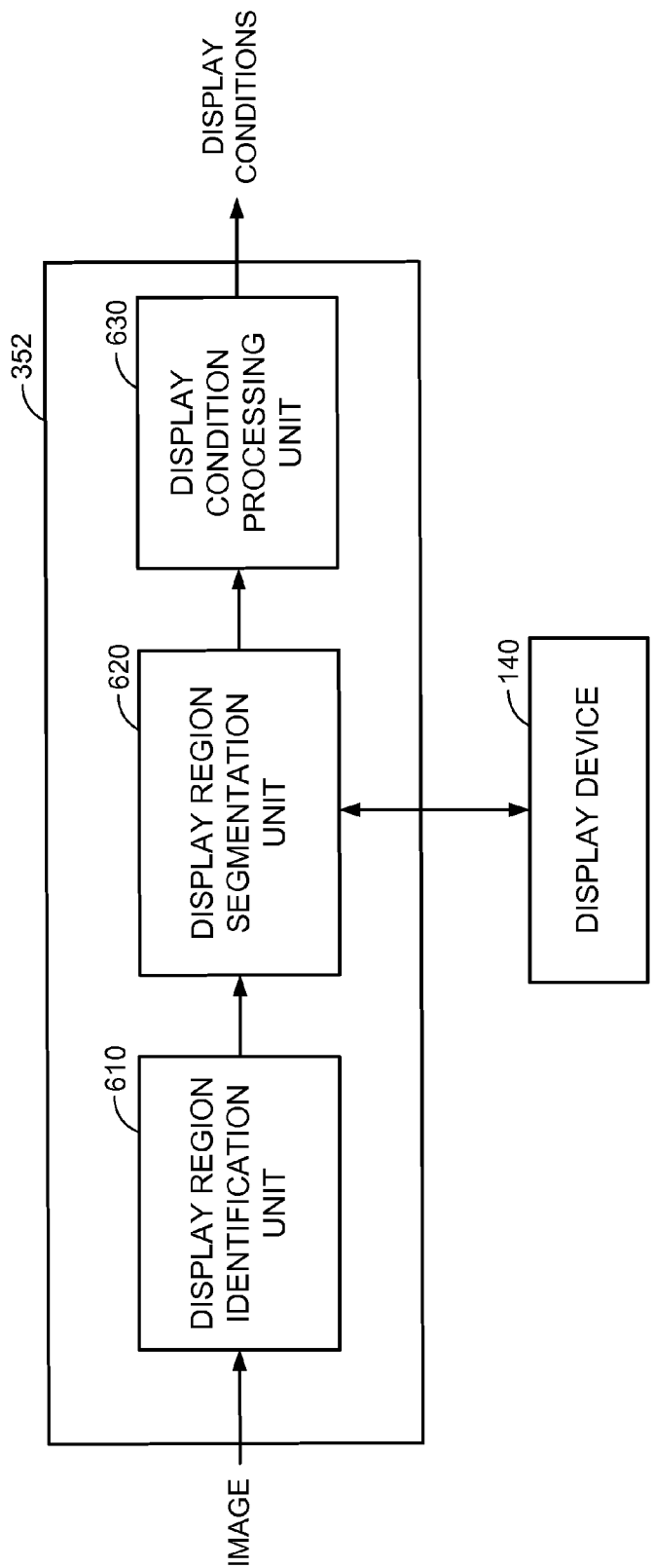
FIG. 6 is a block diagram of a display condition detection unit configured to identify a display region indicative of a screen of a display device from an image including the display device and detect a plurality of display conditions for a plurality of portions in the display region, according to one embodiment of the present disclosure.

FIG. 6 is a block diagram of the display condition detection unit 352 configured to identify a display region indicative of the screen 150 of the display device 140 from an image including the display device 140 and detect a plurality of display conditions for a plurality of portions in the display region, according to one embodiment of the present disclosure. The display condition detection unit 352 may include a display region identification unit 610, a display region segmentation unit 620, and a display condition processing unit 630. To detect the display region of the display device from the image, the display condition detection unit 352 may communicate with the display device 140.

The display region identification unit 610 may be configured to receive one or more images of a scene including the display device 140 from an image sensor arranged on a user with a field of view overlapping at least a portion of a view of the user. In one embodiment, the display region identification unit 610 may identify the display region indicative of a display screen of the display device from the images including the display device 140. For example, the display region may be detected in the images by performing any suitable object detection method such as a boundary detection method, an image matching method, etc. The identified display region may then be provided to the display region segmentation unit 620 in the display condition detection unit 352.

Upon receiving the display region, the display region segmentation unit 620 may segment the display region into a plurality of portions. In this process, the display region segmentation unit 620 may receive, from the display device 140, one or more display image being displayed on the screen 150 of the display device 140. In this case, a reference display condition may be generated by determining one or more display parameter values of a plurality of pixels in the display image received from the display device 140. The display region segmentation unit 620 may then segment the identified display region into a plurality of portions by comparing the reference display condition and the display condition associated with the image including the display device 140.

According to some embodiments, the display region segmentation unit 620 may group a plurality of pixels in the identified display region into one or more portions by comparing the parameter values of the pixels in the identified display region and the parameter values of the corresponding pixels in the display image received from the display device. For a given pixel in the identified display region, the display condition detection unit 352 may determine a difference between a display parameter value of the pixel from the display condition and a display parameter value of the corresponding pixel from the reference display condition. Alternatively, a set of pixels in the identified display region may be selected and a representative parameter value for the set of pixels may be determined. For example, an average parameter value for a plurality of neighboring pixels (e.g., N×M pixels) may be determined and may be compared with an average parameter value for a corresponding set of pixels in the display image received from the display device 140 to determine a difference between the average parameter values.

If the difference is determined to be within a predetermined range of parameter values, the pixel of the display region may be identified as belonging to a portion of the display region for which existing display parameters may be used. Otherwise, the pixel of the display region may be identified as belonging to another portion of the display region for which display parameters may be adjusted. The predetermined range of parameter values may be configured in any suitable manner to group pixels of the display region into any number of portions.

Upon segmenting the display region into one or more portions, the display condition processing unit 630 may determine a display condition for each of the segmented portions in the display region. For example, the display condition may include one or more display parameter values such as a sharpness value, a contrast value, a brightness value, etc. for pixels in the associated portion. The display condition processing unit 630 may provide the output display condition determination unit 356 with the display conditions for the segmented portions in the images.

Figure 7:
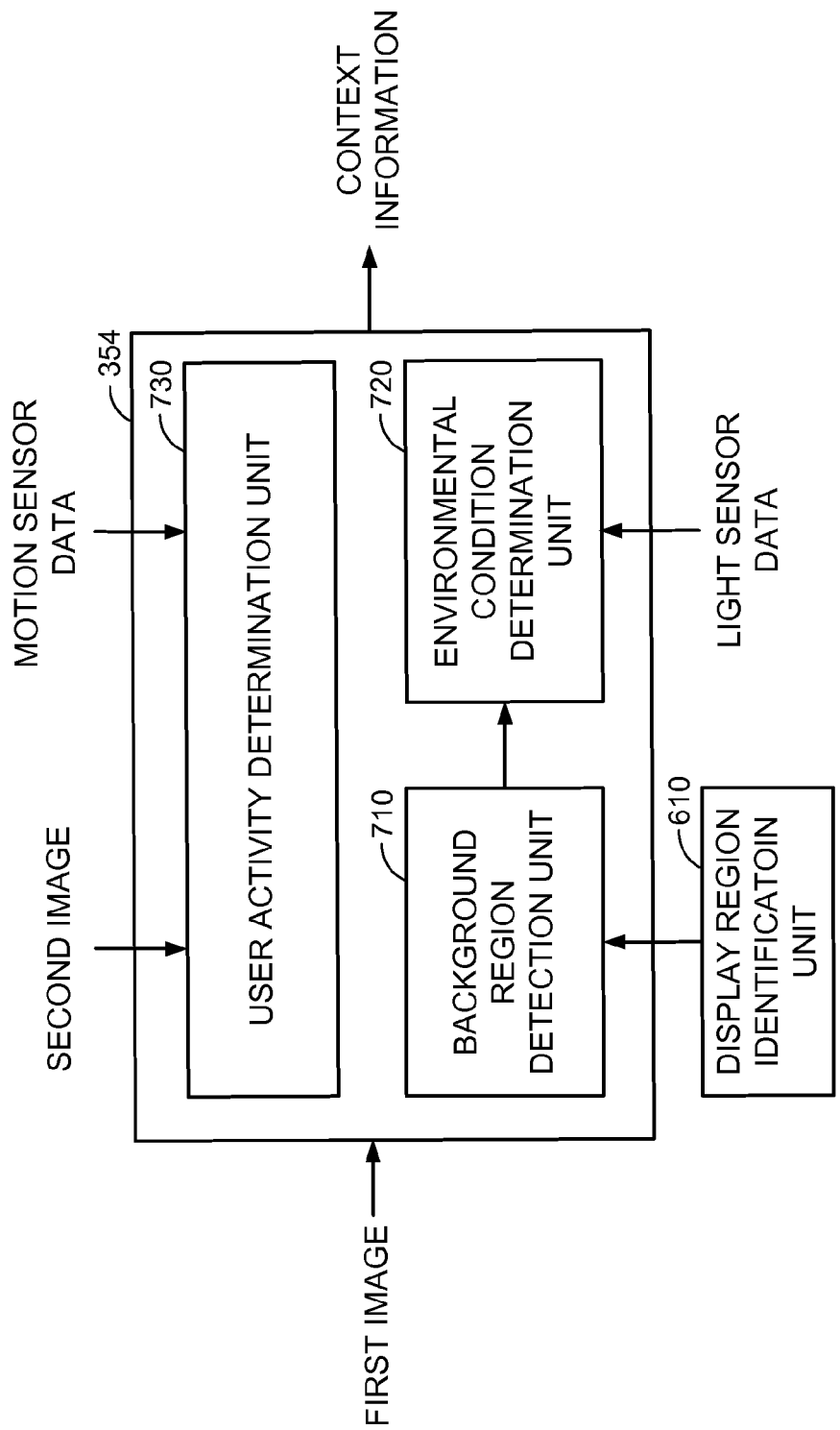
FIG. 7 is a block diagram of a context information determination unit configured to determine context information including an environmental condition and an activity of a user, according to one embodiment of the present disclosure.

FIG. 7 is a block diagram of the context information determination unit 354 configured to determine context information including an environmental condition and an activity of a user, according to one embodiment of the present disclosure. The context information determination unit 354 may include a background region detection unit 710, an environmental condition determination unit 720, and a user activity determination unit 730. The context information determination unit 354 may receive a first image of a scene including the display device 140 that is provided to the display condition detection unit 352. In addition, a second image of a face of the user including his or her eyes, motion sensor data indicative of a movement of the user, and light sensor data indicative of an ambient brightness or illumination level of the display device 140 may be received from the external image sensor 420, the motion sensor 430, and the light sensor 440, respectively, via the communication unit 340 over the network 360.

The background region detection unit 710 in the context information determination unit 354 may receive the identified display region from the display region identification unit 610 and detect a background region located outside the display region in the first image. In one embodiment, the background region detection unit 710 may select a plurality of pixels that are located outside a plurality of pixels in the display region from the first image and detect the selected pixels as a background region. The detected background region may then be provided to the environmental condition determination unit 720 in the context information determination unit 354.

Upon receiving the background region, the environmental condition determination unit 720 may determine an environmental condition of the background region as one of the context information items. In one embodiment, intensities of a plurality of pixels in the background region may be calculated for determining the environmental condition of the background region. Additionally, the environmental condition determination unit 720 may determine the environmental condition based on the light sensor data from the light sensor 440.

The user activity determination unit 730 in the context information determination unit 354 may determine an activity of a user from the first image including the display device 140 as one of the context information items. From the first image including the display device 140, for example, a view direction of the user, a motion or gesture of the user, a distance between the user and the display device 140, etc. may be determined as the activity of the user. In some embodiments, the user activity determination unit 730 may determine the activity of the user such as one or more facial features, eye gestures, or the like of the user from the received second image including the face of the user. Additionally or alternatively, the motion sensor data indicative of a movement of the user may be used in determining the activity of the user. The context information including the environmental condition and the user activity may be provided to the output display condition determination unit 356 in the processor 350 for use in determining an output display condition of the display device 140.

FIG. 8 illustrates an example of a user preference database 800 that may be used in determining an output display condition of a display device according to one embodiment of the present disclosure. The storage unit 330 in the control device 300 may include the user preference database 800. As illustrated, the user preference database 800 may include a plurality of display conditions, a plurality of environmental conditions, a plurality of user activities, and a plurality of output display conditions. The user preference database 800 may map a specified display condition, which is displayed on the display device in a specified environmental condition when a specified activity of a user is detected, to a specified output display condition. Accordingly, the output display condition determination unit 356 may determine an output display condition from the user preference database 800 based on a display condition, an environmental condition, and an activity of a user. In one embodiment, the user preference database 800 may include the plurality of output display conditions mapped to the plurality of display conditions and at least one of the plurality of environmental conditions and the plurality of use activities.

In the illustrated database 800, each of the display conditions is stored as a set of three display parameter values including a sharpness value, a brightness value, and a contrast value for the display device. In addition, each of the environmental conditions in the user preference database 800 is also stored as at least one intensity indicative of an ambient brightness or illumination level of the display device. The activities of user may include a facial expression of the user, a view direction of the user, a motion or gesture of the user, a distance between the user and the display device, and the like that may be indicative of an activity of the user. For example, the user preference database 800 may include a plurality of environmental conditions "ENVIRONMENTAL DATA 808" and "ENVIRONMENTAL DATA 810," both of which are associated with a display condition "display data 802" and an activity of a user "NOD," mapped to a plurality of output display conditions "OUTPUT DISPLAY DATA 818" and "OUTPUT DISPLAY DATA 820," respectively.

The user preference database 800 may be generated and stored in the control device 300. Alternatively, the user preference database 800 may be stored in an external device for access by the control device 300 to obtain an output display condition of the display device. For each of a plurality of display devices, the user preference database 800 may be implemented as a lookup table or any other data structure that can associate output display conditions with display conditions, environmental conditions, and user activities. In addition, such a lookup table may be generated and stored in the control device or the external device for each of a plurality of users.

Figure 9:
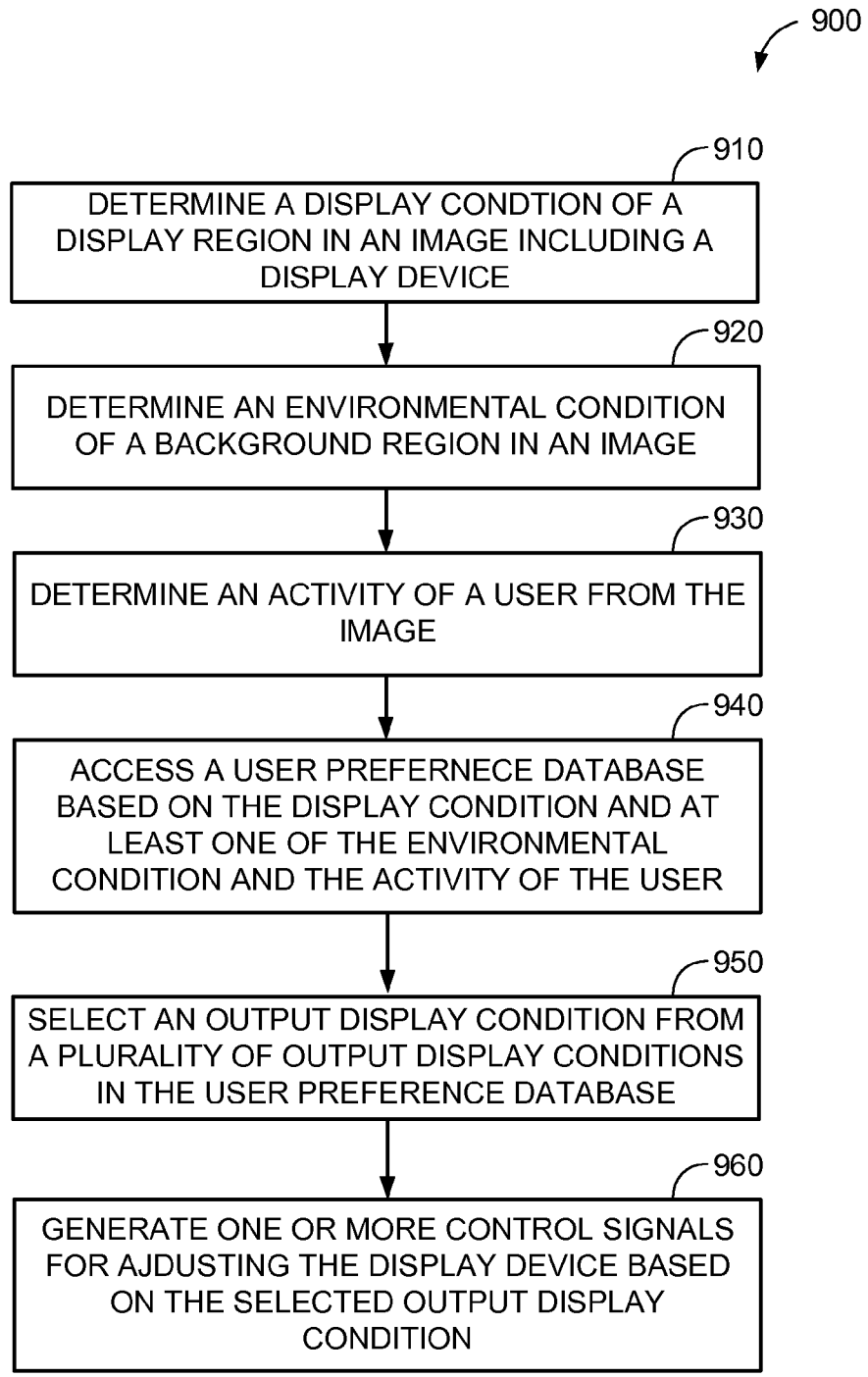
FIG. 9 is a flowchart of a method for generating one or more control signals for adjusting a display device by accessing a user preference database based on a display condition in an image including the display device and at least one of an environmental condition of a background region in the image and a activity of a user, according to one embodiment of the present disclosure.

FIG. 9 is a flowchart of a method 900, performed in the control device 300, for generating one or more control signals for adjusting a display device by accessing the user preference database 800 based on a display condition in an image including the display device and at least one of an environmental condition of a background region in the image and a activity of a user, according to one embodiment of the present disclosure. At 910, the display condition detection unit 352 in the processor 350 may determine a display condition of a display region indicative of a display screen of a display device in an image including the display device that may be received from the image sensor 310 or the external image sensor 410. The context information determination unit 354 in the processor 350 may identify a background region outside the display region in the image and determine an environmental condition of the background region, at 920. In addition, light sensor data (e.g., one or more brightness values) received from the external light sensor 440 may be used for determining the environmental condition of the background region.

At 930, the context information determination unit 354 may also determine an activity of a user from the image including the display device. In one embodiment, the context information determination unit 354 may determine the activity of the user from an image received from the image sensor 420 configured to track the face of the user including his or her eyes. Additionally or alternatively, motion sensor data may be received from the external motion sensor 430 and used for determining the activity of the user associated with the image.

At 940, the output display condition determination unit 356 in the processor 350 may access the user preference database 800 based on the display condition and at least one of the environmental condition and the activity of the user. From a plurality of output display conditions, the output display condition determination unit 356 may select an output display condition associated with the determined display condition and at least one of the determined environmental condition and the activity of the user, at 950. Based on the selected output display condition, the display device control unit 358 in the processor 350 may generate one or more control signals for adjusting the display device and provide the signals to the display device.

Figure 10:
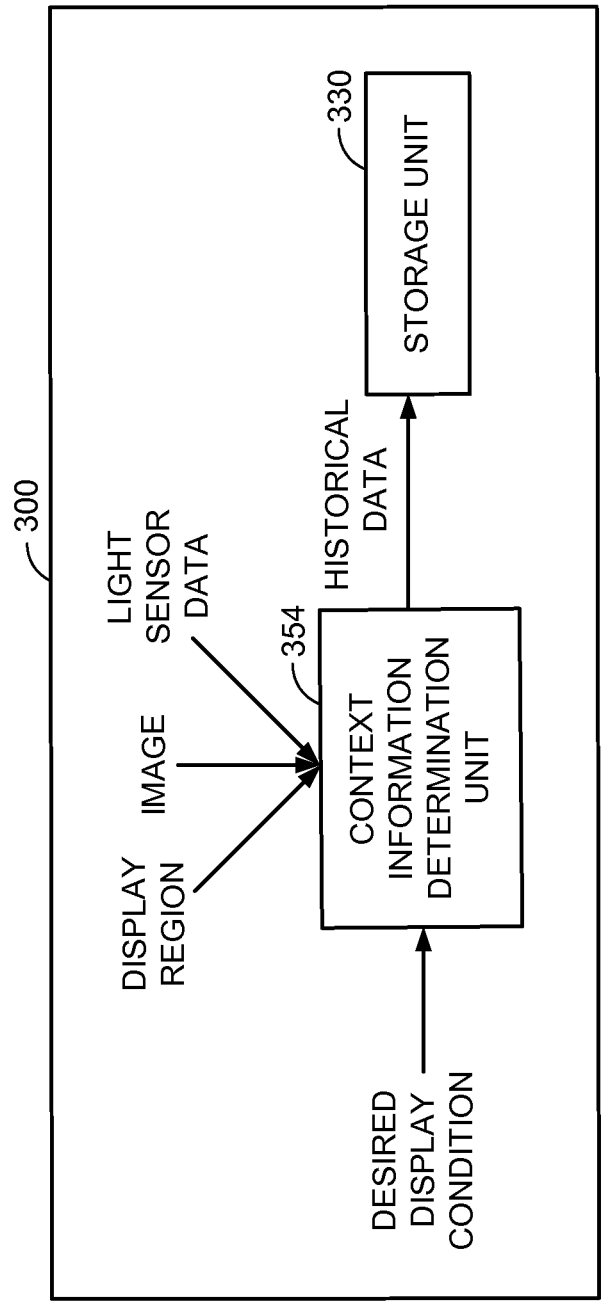
FIG. 10 illustrates a block diagram of a context information determination unit and a storage unit, in which historical data associated with using a display device is generated and stored for use in determining an output display condition of the display device, according to one embodiment of present disclosure.

FIG. 10 illustrates a block diagram of the context information determination unit 354 and the storage unit 330, in which historical data associated with using a display device is generated and stored for use in determining an output display condition of the display device, according to one embodiment of present disclosure. The context information determination unit 354 may receive one or more images of a scene including the display device from the image sensor 310 or from the external image sensor 410 through the communication unit 340 via the network 360 and a display region of the images from the display condition detection unit 352. In addition, the context information determination unit 354 may receive a desired display condition (e.g., one or more display parameter values) of the display device that may be selected by the user via the I/O unit 320 and light sensor data including one or more brightness values from the external light sensor 440 through the communication unit 340 over the network 360. In this case, the desired display condition may be associated with the received images including the display region and the light sensor data. According to one embodiment, the image including the display region may be captured and the light sensor data may be detected when the user may provide a command or input to select the desired display condition of the display device.

In some embodiments, the context information determination unit 354 may detect a background region located outside the display region in the image and determine an environmental condition from intensities of pixels in the background region of the captured image. Additionally or alternatively, the environmental condition of the background region may be determined based on the light sensor data from the light sensor 440. The context information determination unit 354 may generate a pair of the desired display condition and the environmental condition as the historical data. The generated historical data may then be provided to the storage unit 330 for access by the output display condition determination unit 356 to determine an output display condition of the display device. In one embodiment, the historical data may be updated with a desired display condition and an environment condition associated with the desired display condition, in response to an input or command of the user for selecting the desired display condition.

Figure 11:
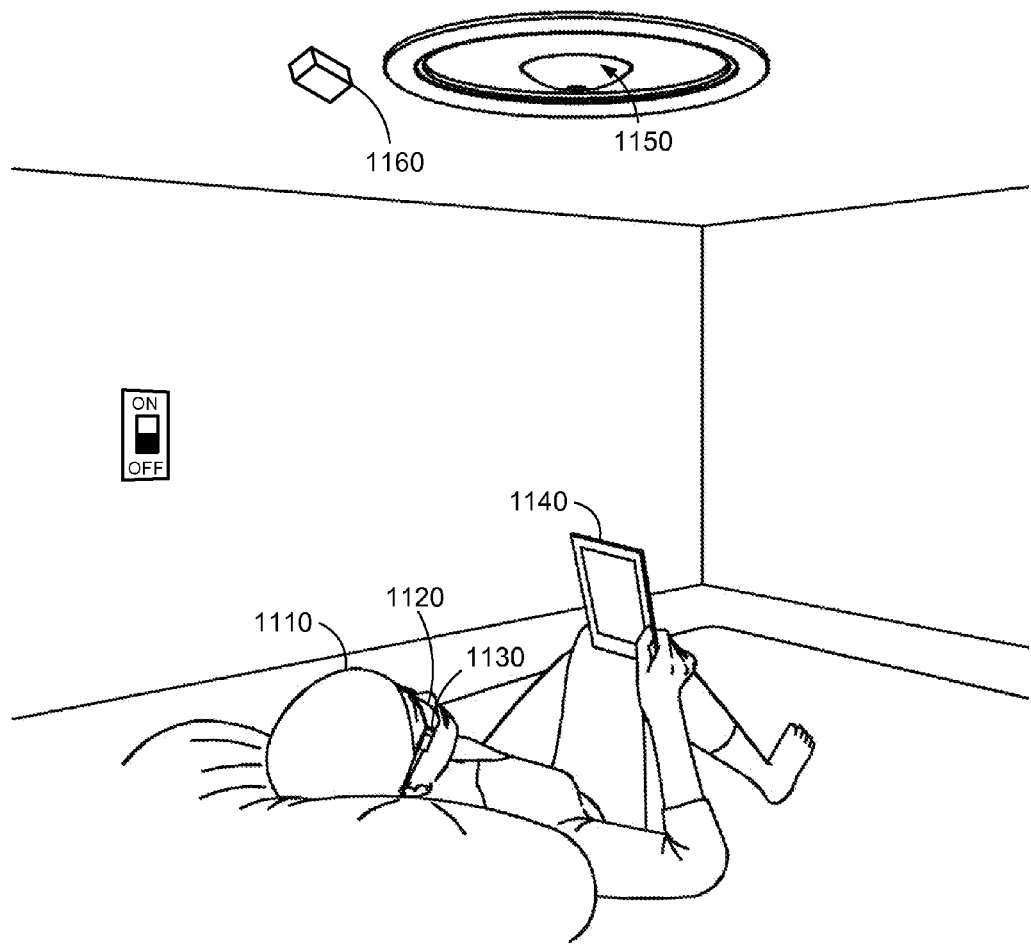
FIG. 11 depicts a wearable device equipped with an image sensor and configured to generating one or more control signals for adjusting a display device based one or more images captured by the image sensor and light sensor data from a light sensor, according to one embodiment of the present disclosure.

FIG. 11 depicts a wearable device 1120 equipped with an image sensor 1130 and configured to generate one or more control signals for adjusting a display device 1140 based one or more images captured by the image sensor 1130 and light sensor data from a light sensor 1160. In FIG. 11, the display device is illustrated as a tablet computer. The wearable device 1120 worn by a user 1110 may function as a control device for controlling the display device 1140 equipped with communication capabilities that may communicate with the wearable device 1120. In addition, the wearable device 1120 may serve as an image capturing device for capturing one or more image of a scene including the display device 1140.

In the illustrated embodiment, a light source 1150 and a light sensor 1160 may be located in a ceiling. A user 1110 is lying on his back in a room and watching a display screen of the display device 1140 at night, for example, to read an e-book that is being displayed on the display screen. While the user 1110 is reading the e-book on the display screen, the light source 1150 may be switched off. The light sensor 1160 may be configured to detect ambient brightness or illumination levels of the display device 1140 and wirelessly send the brightness levels to the wearable device 1120 in real-time.

The wearable device 1120 may perform an analysis of the captured images to detect a display condition of the display device 1140 and determine context information associated with the user 1110 including an environmental condition of a background region in the images and an activity of a user, as described above with reference to FIGS. 6 and 7. Additionally, light sensor data from the light sensor 1160 may be used for determining the environmental condition of the background region. In this embodiment, a brightness value in the detected display condition may be determined to be much greater than an intensity in the environmental condition since the light source 1150 is switched off at night. Additionally, it may be determined as the activity of the user that the user is being farther from the display device 1140. Based on the detected display condition and the determined context information, the wearable device 1120 may determine an output display condition of the display device 1140. In this case, one or more control signals for adjusting the display device 1140 may be generated based on the detected display condition and provided to the display device 1140. For example, the display device 1140 may decrease one or more brightness values for a plurality of pixels in the display screen based on the provided control signals.

Figure 12:
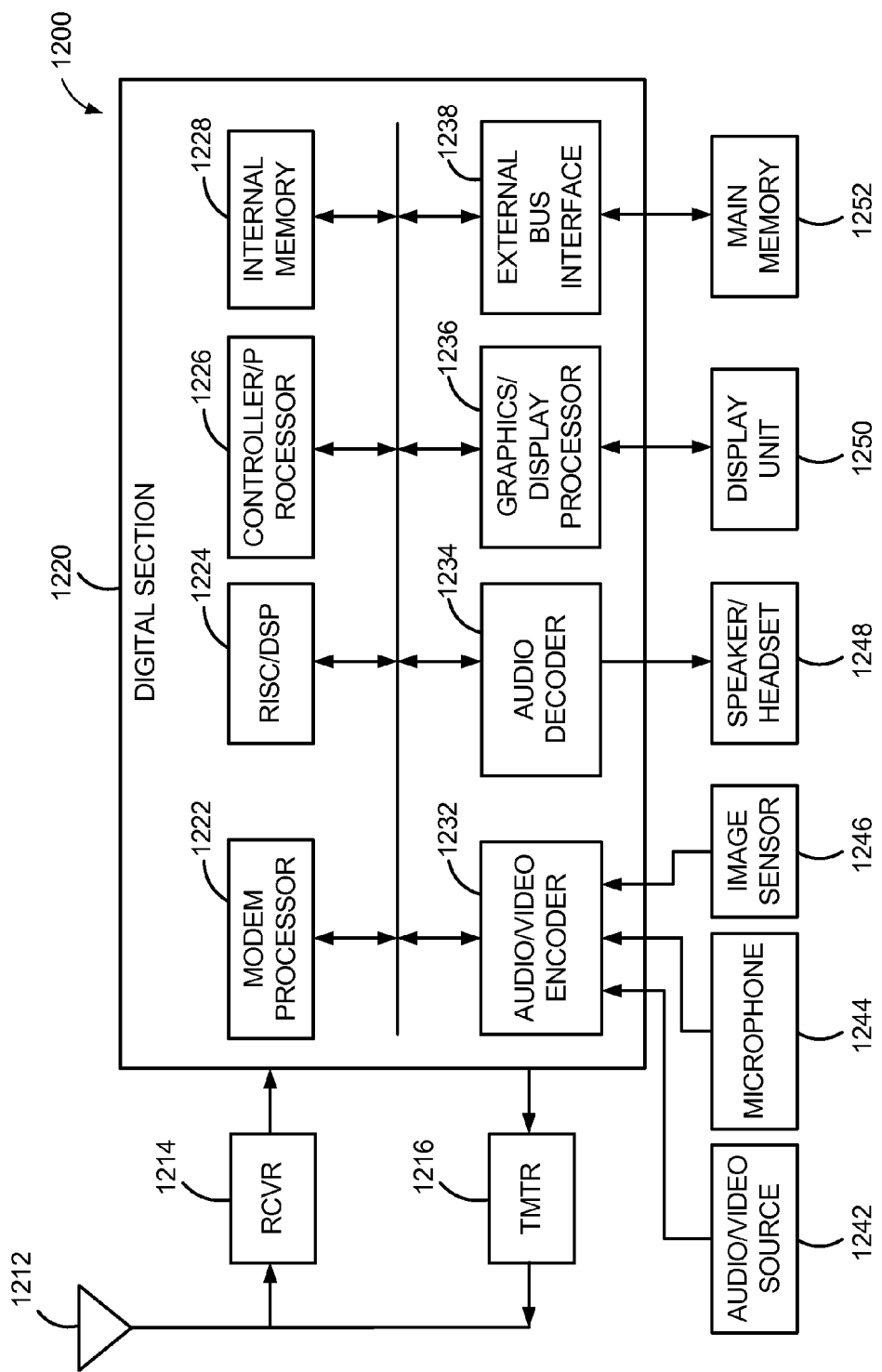
FIG. 12 is a block diagram of an exemplary control device in which the methods and apparatus for controlling a display device in communication with the control device may be implemented, according to one embodiment of the present disclosure.

FIG. 12 is a block diagram of an exemplary control device in which the methods and apparatus for controlling a display device in communication with the control device, according to one embodiment of the present disclosure. The configuration of the control device 1200 may be implemented in the control devices according to the above embodiments described with reference to FIGS. 1 to 11. The control device 1200 may be a cellular phone, a smartphone, a tablet computer, a laptop computer, a terminal, a handset, a personal digital assistant (PDA), a wireless modem, a cordless phone, etc. The wireless communication system may be a Code Division Multiple Access (CDMA) system, a Broadcast System for Mobile Communications (GSM) system, Wideband CDMA (WCDMA) system, Long Tern Evolution (LTE) system, LTE Advanced system, etc. Further, the control device 1200 may communicate directly with another mobile device, e.g., using Wi-Fi Direct or Bluetooth.

The control device 1200 is capable of providing bidirectional communication via a receive path and a transmit path. On the receive path, signals transmitted by base stations are received by an antenna 1212 and are provided to a receiver (RCVR) 1214. The receiver 1214 conditions and digitizes the received signal and provides samples such as the conditioned and digitized digital signal to a digital section for further processing. On the transmit path, a transmitter (TMTR) 1216 receives data to be transmitted from a digital section 1210, processes and conditions the data, and generates a modulated signal, which is transmitted via the antenna 1212 to the base stations. The receiver 1214 and the transmitter 1216 may be part of a transceiver that may support CDMA, GSM, LTE, LTE Advanced, etc.

The digital section 1210 includes various processing, interface, and memory units such as, for example, a modem processor 1222, a reduced instruction set computer/digital signal processor (RISC/DSP) 1224, a controller/processor 1226, an internal memory 1228, a generalized audio/video encoder 1232, a generalized audio decoder 1234, a graphics/display processor 1236, and an external bus interface (EBI) 1238. The modem processor 1222 may perform processing for data transmission and reception, e.g., encoding, modulation, demodulation, and decoding. The RISC/DSP 1224 may perform general and specialized processing for the control device 1200. The controller/processor 1226 may perform the operation of various processing and interface units within the digital section 1210. The internal memory 1228 may store data and/or instructions for various units within the digital section 1210.

The generalized audio/video encoder 1232 may perform encoding for input signals from an audio/video source 1242, a microphone 1244, an image sensor 1246, etc. The generalized audio decoder 1234 may perform decoding for coded audio data and may provide output signals to a speaker/headset 1248. The graphics/display processor 1236 may perform processing for graphics, videos, images, and texts, which may be presented to a display unit 1250. The EBI 1238 may facilitate transfer of data between the digital section 1210 and a main memory 1252.

The digital section 1210 may be implemented with one or more processors, DSPs, microprocessors, RISCs, etc. The digital section 1210 may also be fabricated on one or more application specific integrated circuits (ASICs) and/or some other type of integrated circuits (ICs).

In general, any device described herein may represent various types of devices, such as a wireless phone, a cellular phone, a laptop computer, a wireless multimedia device, a wireless communication personal computer (PC) card, a PDA, an external or internal modem, a device that communicates through a wireless channel, etc. A device may have various names, such as access terminal (AT), access unit, subscriber unit, mobile station, mobile device, mobile unit, mobile phone, mobile, remote station, remote terminal, remote unit, user device, user equipment, handheld device, etc. Any device described herein may have a memory for storing instructions and data, as well as hardware, software, firmware, or combinations thereof.

The techniques described herein may be implemented by various means. For example, these techniques may be implemented in hardware, firmware, software, or a combination thereof. Those of ordinary skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, the various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

For a hardware implementation, the processing units used to perform the techniques may be implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

Thus, the various illustrative logical blocks, modules, and circuits described in connection with the disclosure herein are implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternate, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored on or transmitted over as one or more instructions or code on a computer-readable medium. Computer-readable media include both computer storage media and communication media including any medium that facilitates the transfer of a computer program from one place to another. A storage media may be any available media that can be accessed by a computer. By way of example, and not limited thereto, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Further, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc, where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein are applied to other variations without departing from the spirit or scope of the disclosure. Thus, the disclosure is not intended to be limited to the examples described herein but is to be accorded the widest scope consistent with the principles and novel features disclosed herein.

Although exemplary implementations are referred to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices may include PCs, network servers, and handheld devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method, performed in a control device, for adjusting a display device in communication with the control device, the method comprising:

receiving, from an image sensor, a first image of a first scene including the display device, the image sensor being configured with a field of view overlapping at least a portion of a view of a user;

determining first context information from the first image;

receiving user input indicating a selected display condition to be associated with the first context information;

receiving, from the image sensor, a second image of a second scene including the display device;
determining second context information from the second image; and
based on the second context information corresponding to the first context information, generating a control signal for adjusting the display device based on the selected display condition.

2. The method of claim 1, further comprising providing the control signal to the display device, the control signal indicative of one or more display parameters for adjusting the display device.

3. The method of claim 1, further comprising:
determining a first detected display condition of the display device from the first image; and
determining a second detected display condition of the display device from the second image, wherein the control signal is generated based further on the second detected display condition corresponding to the first detected display condition.

4. The method of claim 3, wherein determining the first display condition comprises:
identifying a display region indicative of a display screen of the display device from the first image; and
determining a plurality of sharpness values, a plurality of brightness values, a plurality of contrast values for a plurality of pixels in the display region, or a combination thereof.

5. The method of claim 4, wherein determining the first detected display condition based on the display region comprises:
receiving, from the display device, a display image displayed via the display device;
detecting a reference display condition from the display image;
segmenting the display region into a plurality of portions based on a comparison between the display condition and the reference display condition; and
determining a plurality of display conditions for the plurality of portions in the display region.

6. The method of claim 1, further comprising identifying a facial expression or a gesture of the user based on a third image of the user, wherein the first context information is based further on the facial expression or the gesture.

7. The method of claim 1, wherein determining the first context information includes determining an environmental condition of a background region in the first image.

8. The method of claim 1, wherein determining the first context information from the first image comprises determining an activity of the user from the first image.

9. The method of claim 1, wherein a plurality of output display conditions are mapped to a plurality of context information items.

10. The method of claim 9, further comprising storing a mapping between the first context information and the selected display condition in response to the user input.

11. The method of claim 1, further comprising receiving light data from a light sensor, wherein the first context information is based further on the light data.

12. The method of claim 1, further comprising:
receiving, from the image sensor, a third image of a third scene including the display device;
determining a difference between the control signal and a second control signal generated based on the third image; and
determining, based on the difference, an interval between generating the second control signal and generating a third control signal.

13. A control device comprising:
a context information determination unit configured to:
determine first context information from a first image of a first scene including a display device, the first image received from an image sensor configured with a field of view overlapping at least a portion of a view of a user; and
determine second context information from a second image of a second scene including the display device, the second image received from the image sensor;
an output display condition determination unit configured to receive user input indicating a selected display condition to be associated with the first context information; and
a display device control unit configured to generate a control signal for adjusting the display device based on the selected display condition in response to the second context information corresponding to the first context information.

14. The control device of claim 13, further including a motion sensor, wherein the first context information is determined based further on motion data from the motion sensor.

15. The control device of claim 14, wherein the motion data indicates movement of the user toward the display device and the first context information indicates the movement.

16. The control device of claim 13, further comprising a display condition detection unit is configured to:
identify a display region indicative of a display screen of the display device from the first image; and
determine a detected display condition based on the display region identified in the first image.

17. The control device of claim 16, wherein the display condition detection unit is configured to determine at least one of a plurality of sharpness values, a plurality of brightness values, and a plurality of contrast values for a plurality of pixels in the display region.

18. The control device of claim 16, wherein the display condition detection unit is configured to:
receive, from the display device, a display image displayed on the display device;
detect a reference display condition from the display image;
segment the display region into a plurality of portions based on a comparison between the display condition and the reference display condition; and
determine a plurality of display conditions for the plurality of portions in the display region.

19. The control device of claim 18, wherein the context information determination unit is further configured to determine the first context information based further on a facial expression or a gesture of the user detected in a third image of the user.

20. The control device of claim 13, wherein the context information determination unit is configured to determine an activity of the user from the first image.

21. The control device of claim 13, wherein each of a plurality of output display conditions is mapped to one of a plurality of sets, each set including one of a plurality of display conditions and one or more of a plurality of context information items, and wherein the context information items include at least one of a plurality of environmental conditions or at least one of a plurality of activities of the user.

22. The control device of claim 21, wherein the output display condition determination unit is configured to select the selected display condition from the plurality of output display conditions based on the second context information.

23. The control device of claim 13, wherein the context information determination unit is further configured to determine the first context information based further on light data received from a light sensor.

24. The control device of claim 13, wherein the context information determination unit is configured to:
receive sensor data from one or more environmental sensors; and
determine the first context information based further on the sensor data.

25. A non-transitory computer-readable storage medium comprising instructions for adjusting a display device in communication with a control device, the instructions causing a processor of the control device to perform operations including:
receiving a first image of a first scene including the display device from an image sensor configured with a field of view overlapping at least a portion of a view of a user;
determining first context information from the first image;
receiving user input indicating a selected display condition to be associated with the first context information;
receiving, from the image sensor, a second image of a second scene including the display device;
determining second context information from the second image; and
based on the second context information corresponding to the first context information, generating a control signal for adjusting the display device based on the selected display condition.

26. The non-transitory computer-readable storage medium of claim 25, further comprising detecting a display condition of the display device from the first image by:
identifying a display region indicative of a display screen of the display device from the first image; and
determining the display condition based on the display region identified in the first image.

27. The non-transitory computer-readable storage medium of claim 26, wherein the operations further include wirelessly transmitting the control signal from the control device to the display device.

28. A control device for adjusting a display device in communication with the control device, comprising:
means for receiving a first image of a first scene including the display device;
means for determining first context information from the first image;
means for receiving user input indicating a selected display condition to be associated with the first context information;
means for receiving a second image of a second scene including the display device;
means for determining second context information from the second image; and
means for generating a control signal for adjusting the display device based on the selected display condition in response to the second context information corresponding to the first context information.

29. The control device of claim 28, further comprising means for detecting a display condition of the display device from the first image is configured to:
identify a display region indicative of a display screen of the display device from the first image; and
determine the display condition based on the display region identified in the first image.

30. The control device of claim 29, wherein the means for determining the first context information is further configured to determine an environmental condition of a background region located outside the display region in the first image.

* * * * *